(12) United States Patent
Nagayasu

(10) Patent No.: US 12,485,705 B2
(45) Date of Patent: Dec. 2, 2025

(54) PNEUMATIC TIRE

(71) Applicant: The Yokohama Rubber Co., LTD., Tokyo (JP)

(72) Inventor: Masaaki Nagayasu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 570 days.

(21) Appl. No.: 17/289,264

(22) PCT Filed: Oct. 10, 2019

(86) PCT No.: PCT/JP2019/039963
§ 371 (c)(1),
(2) Date: Apr. 28, 2021

(87) PCT Pub. No.: WO2020/110474
PCT Pub. Date: Jun. 4, 2020

(65) Prior Publication Data
US 2021/0394561 A1    Dec. 23, 2021

(30) Foreign Application Priority Data

Nov. 26, 2018   (JP) ................................ 2018-220261

(51) Int. Cl.
*B60C 11/12*        (2006.01)
(52) U.S. Cl.
CPC ...... *B60C 11/1218* (2013.01); *B60C 11/1236* (2013.01); *B60C 2011/1213* (2013.01)
(58) Field of Classification Search
CPC ............. B60C 11/1218; B60C 11/1236; B60C 2011/129; B60C 2011/1295
See application file for complete search history.

(56) References Cited

U.S. PATENT DOCUMENTS

| 5,327,953 A | * | 7/1994 | Ichiki | ................. | B29D 30/0606 |
| | | | | | 152/902 |
| 2013/0118662 A1 | * | 5/2013 | Kameda | .............. | B60C 11/0318 |
| | | | | | 152/209.8 |

(Continued)

FOREIGN PATENT DOCUMENTS

| AT | 257776 T | 1/2004 |
| CA | 2099890 A | 7/1993 |

(Continued)

OTHER PUBLICATIONS

Suzuki, English Machine Translation of JP 2009255734, 2009 (Year: 2009).*

(Continued)

*Primary Examiner* — Christina A Johnson
*Assistant Examiner* — Brendon Charles Darby
(74) *Attorney, Agent, or Firm* — Thorpe North & Western

(57) ABSTRACT

In a pneumatic tire, a tread portion including rows of land portions defined by circumferential grooves extending in a tire circumferential direction is formed by sectors divided in the tire circumferential direction, sipes extending in a tire width direction formed in the land portions include a three-dimensional sipe, whose shape tread surface changes along a sipe depth direction, and a two-dimensional sipe, whose shape is constant along the sipe depth direction, and a ratio R1 of a number of the three-dimensional sipes with respect to a total number of the sipes in a first boundary region, which is within 15 mm on one side of a sector dividing position in the tire circumferential direction, and a ratio Rt of a number of the three-dimensional sipes with respect to a total number of the sipes in all of the tread portion satisfy relationship R1<Rt.

6 Claims, 3 Drawing Sheets

(56) References Cited

U.S. PATENT DOCUMENTS

| | | |
|---|---|---|
| 2013/0328240 A1 | 12/2013 | Takahashi |
| 2014/0265033 A1 | 9/2014 | Woloszyn et al. |
| 2015/0041034 A1 | 2/2015 | Matsushita |
| 2015/0151586 A1* | 6/2015 | Furusawa ............... B60C 11/11 152/209.25 |
| 2017/0129287 A1 | 5/2017 | Satoi |
| 2017/0305201 A1 | 10/2017 | Akashi |

FOREIGN PATENT DOCUMENTS

| | | | |
|---|---|---|---|
| CN | 103481410 A | 1/2014 | |
| CN | 104044230 A | 9/2014 | |
| DE | 19710400 A | 3/1997 | |
| DK | 864448 T | 2/1998 | |
| EP | 579436 A1 | 1/1994 | |
| EP | 0864448 A2 | 9/1998 | |
| EP | 2671710 A1 | 12/2013 | |
| EP | 2777922 A1 | 9/2014 | |
| FI | 933026 A | 1/1994 | |
| JP | 5-24044 A | 2/1993 | |
| JP | 6-31832 A | 2/1994 | |
| JP | 2001-150446 A | 6/2001 | |
| JP | 2002-292640 A | 10/2002 | |
| JP | 2002-316328 A | 10/2002 | |
| JP | 3494511 B2 | 11/2003 | |
| JP | 2005-162197 A | 6/2005 | |
| JP | 2005-205988 A | 8/2005 | |
| JP | 2006-082632 A | 3/2006 | |
| JP | 2009-255734 A | 11/2009 | |
| JP | 2010006107 A * | 1/2010 | ......... B60C 11/0058 |
| JP | 4411975 B2 | 2/2010 | |
| JP | 2012-041024 A | 3/2012 | |
| JP | 2013-136366 A | 7/2013 | |
| JP | 2013-252690 A | 12/2013 | |
| JP | 2014079949 A * | 5/2014 | |
| JP | 2014108665 A * | 6/2014 | |
| JP | 2005-041339 A | 2/2015 | |
| JP | 2016-168966 A | 9/2016 | |

OTHER PUBLICATIONS

Seta, English Machine Translation of JP 2010006107, 2010 (Year: 2010).*

Amano, English Machine Translation of JP 2014108665, 2014 (Year: 2014).*

Yaguchi, English Machine Translation of JP 2014079949, 2014 (Year: 2014).*

* cited by examiner

PNEUMATIC TIRE

TECHNICAL FIELD

The present technology relates to a pneumatic tire and particularly relates to a pneumatic tire that allows enhancing braking performance on wet road surfaces and icy and snowy road surfaces and suppressing poor appearance generated during vulcanization molding, without changing the appearance of a tire.

BACKGROUND ART

During vulcanization molding of a pneumatic tire including a plurality of sipes in a tread portion, a problem occurs in which rubber forming the tread portion (tread rubber) bonds to a tire mold, generating poor appearance in a vulcanized pneumatic tire. Such a bonding between the tire mold and the tread rubber is significant in winter tires in which a large number of sipes are disposed in a tread portion. With respect to this problem, when using a sectional tire mold that forms a tread portion by sectors divided in a tire circumferential direction, reducing the number of sipes in the vicinity of a sector dividing position and shortening the length of the sipes in a tire width direction has been proposed (for example, see Japan Patent Nos. 3494511 and 4411975).

However, this method involves a problem of causing a change in the appearance of a tire because the presence of sipes and the length thereof are different between the vicinity of the sector dividing position and other portions. Further, reduction in the number of sipes and the length thereof causes deterioration in wet performance (braking performance on wet road surfaces) and snow performance (braking performance on icy and snowy road surfaces), both of which are based on the sipes, and thus there is a risk that a sufficient tire performance originally intended may not be obtained.

SUMMARY

The present technology provides a pneumatic tire that allows enhancing braking performance on wet road surfaces and icy and snowy road surfaces and suppressing the occurrence of poor appearance, without changing the appearance of a tire.

A pneumatic tire according to an embodiment of the present technology includes: in a tread portion, a plurality of circumferential grooves extending in a tire circumferential direction; a plurality of rows of land portions defined by the plurality of circumferential grooves; in at least one of the land portions, a plurality of sipes extending in a tire width direction; and the tread portion being formed by a plurality of sectors divided in the tire circumferential direction. The plurality of sipes include: a three-dimensional sipe whose shape appearing on a tread surface changes along a sipe depth direction; and a two-dimensional sipe whose shape appearing on the tread surface is constant along the sipe depth direction. When a range within 15 mm on one side of a sector dividing position in the tire circumferential direction is defined as a first boundary region, a ratio $R1$ of the number of a plurality of the three-dimensional sipes disposed in the first boundary region with respect to the total number of the plurality of sipes disposed in the first boundary region and a ratio $Rt$ of the number of the plurality of three-dimensional sipes in all of the tread portion with respect to the total number of the plurality of sipes in all of tread portion satisfy the relationship $R1 < Rt$.

As described above, in a pneumatic tire according to an embodiment of the present technology including a tread portion formed by a plurality of sectors divided in a tire circumferential direction, a plurality of rows of land portions are defined by a plurality of circumferential grooves, the land portions including a plurality of sipes extending in a tire width direction. The plurality of sipes include a three-dimensional sipe and a two-dimensional sipe, and a ratio $R1$ of the number of a plurality of the three-dimensional sipes in a first boundary region is smaller than a ratio $Rt$ of the number of a plurality of the three-dimensional sipes in all of the tread portion. Thus, bonding between a tire mold and tread rubber can be prevented, and the occurrence of poor appearance can be suppressed. Specifically, the two-dimensional sipe is formed by a blade having less unevenness in a depth direction, and the blade tends to come out easily after vulcanization. The three-dimensional sipe is formed by a blade having more unevenness in the depth direction, and the blade tends to come out less easily after vulcanization. Accordingly, a few of the three-dimensional sipes, from which the blades come out less easily, can be disposed (disposing many of the two-dimensional sipes, from which the blades come out more easily) in the vicinity of a sector dividing position (first boundary region) where the tread rubber tends to bond to the tire mold easily, and thus bonding between the tire mold and the tread rubber can be prevented. On the other hand, the two-dimensional sipe, which has a simpler structure than that of the three-dimensional sipe, tends to yield lower running performance based on the sipe (wet performance and snow performance) than that of the three-dimensional sipe, However, since a region where the ratio of the number of the three-dimensional sipes is reduced is limited to the first boundary region where contribution to bonding between the tire mold and the tread rubber is great, still a sufficient number of the three-dimensional sipes can be provided on a tire as a whole, and good running performance based on the plurality of sipes (wet performance and snow performance) can be obtained. By using the two-dimensional sipe or the three-dimensional sipe, that is, by using a difference in the sipe structure along the depth direction, rather than the sipe shape appearing on the tread surface, to adjust the easiness with which a blade comes out (the difficulty with which the rubber and the mold bond), this has no effect on the appearance of the tire (the sipe shape appearing on the tread surface).

In an embodiment of the present technology, a ratio $R1/Rt$ of a ratio $R1$ and a ratio $Rt$ is preferably not greater than 0.80. The ratio of the three-dimensional sipes in the first boundary region can thus be sufficiently reduced to prevent bonding between the tire mold and the tread rubber, and the occurrence of poor appearance can be advantageously suppressed.

In an embodiment of the present technology, the plurality of rows of land portions include three or more rows of land portions including a pair of shoulder land portions, and in a configuration in which: all of the land portions include a plurality of sipes; the ratio of the number of the three-dimensional sipes disposed in the first boundary region of each of the land portions with respect to the total number of the plurality of sipes disposed in the first boundary region of each of the land portions is $R1'$; and the ratio of the number of the three-dimensional sipes in an entire circumference of each of the land portions with respect to the total number of the plurality of sipes in the entire circumference of each of the land portions is Rt', a ratio R1'/Rt' in the shoulder land portion is preferably smaller than a ratio R1'/Rt' in any other land portion. A relationship of a ratio R1'/Rt' of each of the land portions can thus be set to reduce the ratio of the three-dimensional sipes included in the first boundary region in the shoulder land portion where bonding between the tire mold and the tread rubber is relatively easily generated, and such a configuration effectively prevents bonding between the tire mold and the tread rubber and advantageously suppresses the occurrence of poor appearance.

In an embodiment of the present technology, the plurality of rows of land portions include three or more rows of land portions including a pair of shoulder land portions, and in a configuration in which: all of the land portions have a plurality of sipes; the ratio of the number of the three-dimensional sipes disposed in the first boundary region of each of the land portions with respect to the total number of a plurality of sipes disposed in the first boundary region of each of the land portions is R1'; and the ratio of the number of the three-dimensional sipes in an entire circumference of each of the land portions with respect to the total number of a plurality of sipes in the entire circumference of each of the land portions is Rt', an inclination angle, with respect to the tire width direction, of the plurality of sipes provided in the first boundary region of a land portion having a smallest ratio R1'/Rt' is preferably smaller than an inclination angle, with respect to the tire width direction, of the plurality of sipes provided in the first boundary region of any other land portion. Generally, the smaller an inclination angle of a sipe is, the less easily a blade forming the sipe comes out, and thus an inclination angle of a sipe and a ratio R1'/Rt' can be associated to reduce the ratio of the three-dimensional sipes included in the first boundary region where the inclination angle of the plurality of sipes is small and the blades come out less easily, effectively preventing bonding between the tire mold and the tread rubber and advantageously suppressing the occurrence of poor appearance.

In an embodiment of the present technology, when a range within 5 mm on one side of the sector dividing position in the tire circumferential direction is defined as a second boundary region, a ratio R1 of the number of the three-dimensional sipes disposed in the first boundary region with respect to the total number of the plurality of sipes disposed in the first boundary region and a ratio R2 of the number of the three-dimensional sipes disposed in the second boundary region with respect to the total number of the plurality of sipes disposed in the second boundary region preferably satisfy the relationship R1>R2. Thus setting a relationship between the ratios R1, R2 reduces the ratio of the three-dimensional sipes toward the sector dividing position, effectively preventing bonding between the tire mold and the tread rubber and advantageously suppressing the occurrence of poor appearance.

In an embodiment of the present technology, an average D1 of the maximum depths of the plurality of sipes disposed in the first boundary region and an average Dt of the maximum depths of the plurality of sipes in all of the tread portion preferably satisfy the relationship D1<Dt. Generally, the smaller a maximum depth of a sipe is, the more easily a blade forming the sipe comes out, and by reducing the depths of a plurality of sipes in the vicinity of the sector dividing position (first boundary region) where the tread rubber tends to bond to the mold easily, bonding between the tire mold and the tread rubber can be effectively prevented and the occurrence of poor appearance can be advantageously suppressed.

DETAILED DESCRIPTION

Figure 1:
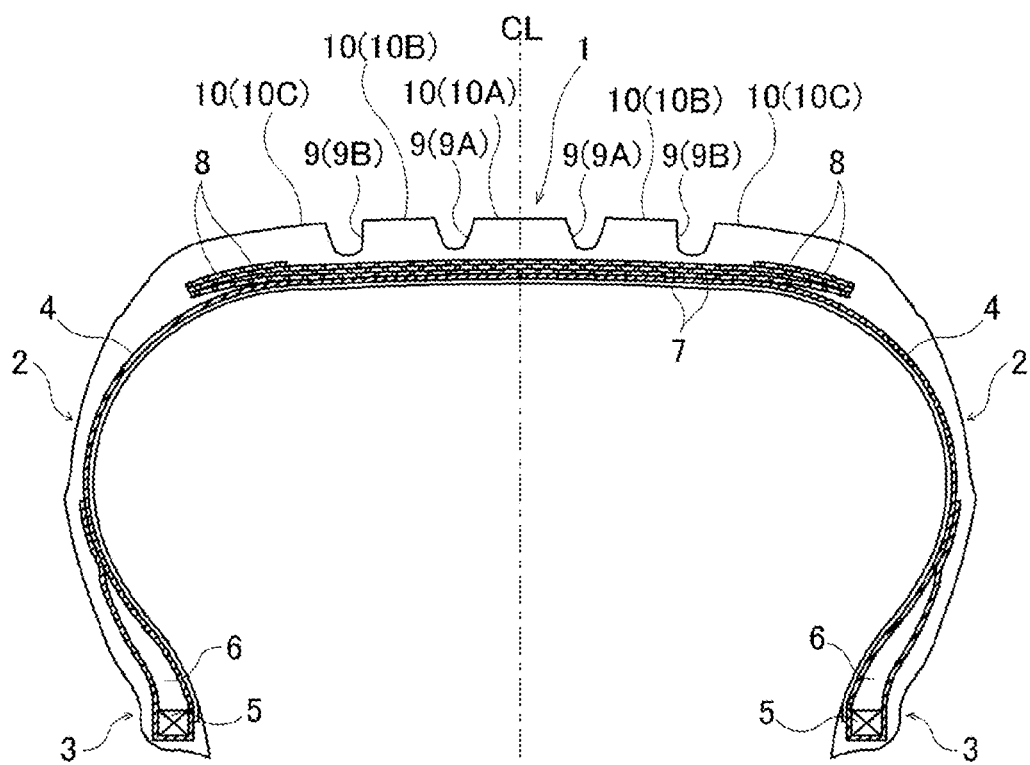
FIG. 1 is a meridian cross-sectional view of a pneumatic tire according to an embodiment of the present technology.
Figure 2:
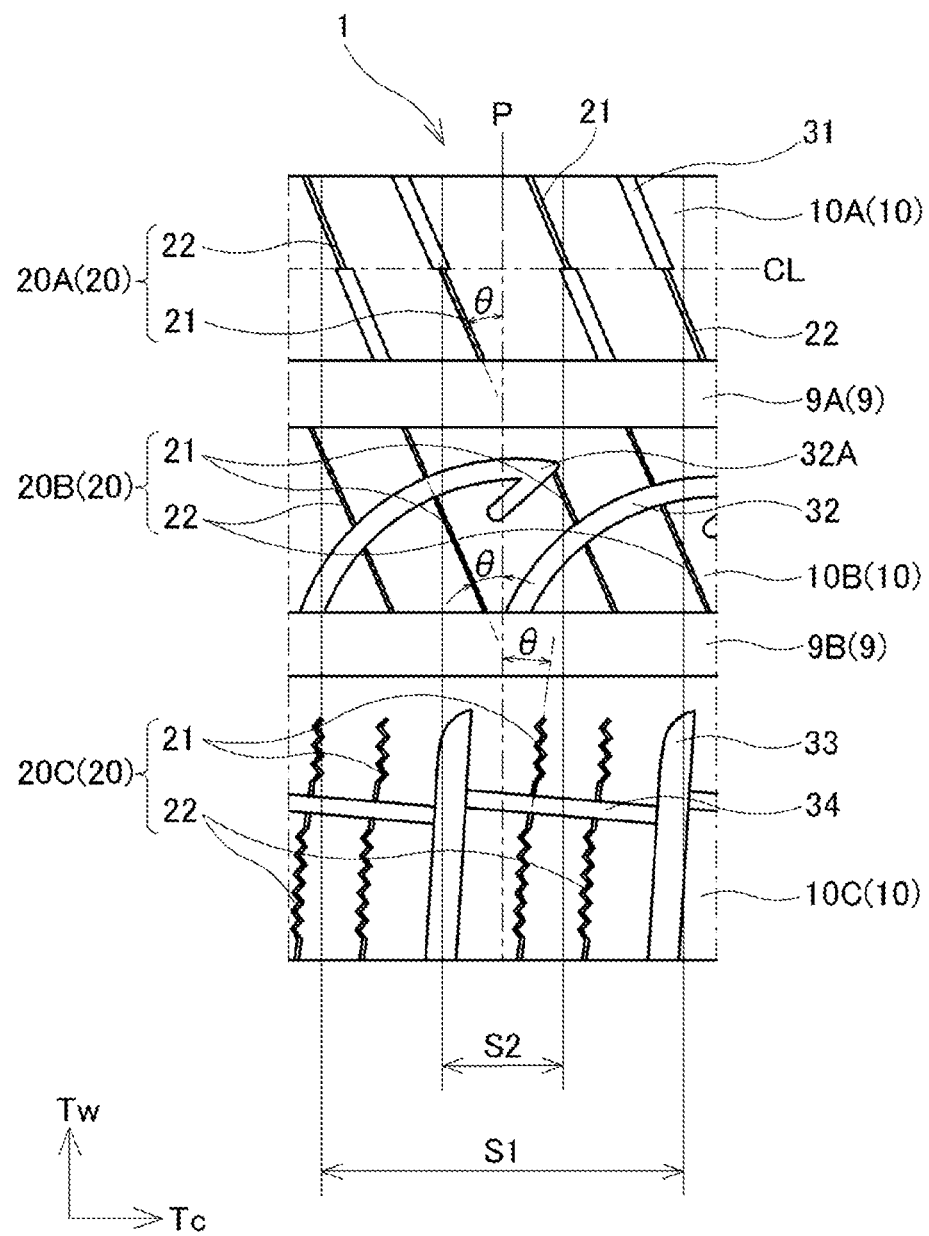
FIG. 2 is a plan view illustrating a tread portion of a pneumatic tire according to an embodiment of the present technology.

Configurations of embodiments of the present technology will be described in detail below with reference to the accompanying drawings. FIG. 1 and FIG. 2 illustrate a pneumatic tire according to an embodiment of the present technology. In FIG. 2, Tc denotes a tire circumferential direction and Tw denotes a tire width direction.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 in an inner side in a tire radial direction. Note that "CL" in FIG. 1 denotes a tire equator. Additionally, FIG. 1 is a meridian cross-sectional view, and accordingly, although not illustrated, each of the tread portion 1, the sidewall portions 2, and the bead portions 3 extends in the tire circumferential direction to form an annular shape. Thus, the basic structure of the toroidal shape of the pneumatic tire is configured. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the outer circumference of the bead cores 5, and each of the bead fillers 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°. The present technology may be applied to such a pneumatic tire having a general cross-sectional structure; however, the basic structure is not limited to the aforementioned structure.

The pneumatic tire is vulcanized and molded using a sectional tire mold. The tire mold includes an annular side mold for molding the tread portion 1, and the side mold includes sectors plurally divided along the tire circumferential direction. The sectors divided into 7 to 11 in the tire circumferential direction are usually used. As illustrated in FIG. 2, the tread portion 1 includes a sector dividing position P as well as a first boundary region S1 and a second boundary region S2, both of which include the sector dividing position P. The boundary regions S1, S2 each have a predetermined length in the tire circumferential direction on both sides of the sector dividing position P as the center. Specifically, the first boundary region S1 is a region within 15 mm in the tire circumferential direction on one side of the sector dividing position P as the center. Additionally, the second boundary region S2 is a region within 5 mm in the tire circumferential direction on one side of the sector dividing position P as the center.

Four circumferential grooves 9 extending in the tire circumferential direction are formed in the tread portion 1. The circumferential grooves 9 include a pair of inner circumferential grooves 9A located on both sides of a tire center line CL and a pair of outer circumferential grooves 9B located on the outermost side in the tire width direction. Land portions 10 are defined by the four circumferential grooves 9 in the tread portion 1. The land portions 10 include a center land portion 10A located on the tire center line CL, a pair of intermediate land portions 10B located on the outer side of the center land portion 10A in the tire width direction, and a pair of shoulder land portions 10C located on the outer side of the respective intermediate land portions 10B in the tire width direction. A plurality of sipes 20 extending in the tire width direction are formed in at least one row of the land portion 10 of the land portions 10A to 10C. The sipes 20 can be formed in a linear or zigzag-like manner on a road contact surface of the tread portion 1. The sipes 20 are narrow grooves having a groove width of 1.5 mm or less.

More specifically, a plurality of sipes 20A and a plurality of narrow grooves 31, which are inclined in the same direction with respect to the tire width direction, are disposed at intervals in the tire circumferential direction in the center land portion 10A. One end of the sipe 20A communicates with the inner circumferential groove 9A, and the other end communicates with the narrow groove 31. On the other hand, the narrow groove 31 is a groove having a larger groove width than that of the sipe 20A. One end of the narrow groove 31 communicates with the inner circumferential groove 9A, and the other end communicates with the sipe 20A. The sipes 20A and the narrow grooves 31 are disposed alternately in the tire circumferential direction such that the narrow grooves 31 are disposed in a staggered manner in the tire circumferential direction in the center land portion 10A as a whole.

A plurality of lug grooves 32 inclined in the same direction with respect to the tire width direction are disposed at intervals in the tire circumferential direction in the intermediate land portion 10B. While one end of the lug groove 32 opens to the outer circumferential groove 9B, the other end terminates within the intermediate land portion 10B. The lug groove 32 includes a bent portion 32A formed in an acute angle manner at a midway position between the one end and the other end. A plurality of sipes 20B extending in a direction intersecting with the lug grooves 32 are disposed at intervals in the tire circumferential direction. The sipes 20B are divided into a plurality of portions by intersecting with the lug grooves 32, and the divided portions are disposed on the same straight lines. At least one end of the sipe 20B communicates with the outer circumferential groove 9B.

A plurality of lug grooves 33 inclined in the same direction with respect to the tire width direction are disposed at intervals in the tire circumferential direction in the shoulder land portion 10C. The lug grooves 33 do not communicate with the outer circumferential groove 9B. A plurality of narrow grooves 34 that communicate with the lug grooves 33 and extend in the tire circumferential direction are formed. A plurality of sipes 20C inclined in the same direction with respect to the tire width direction are disposed at intervals in the tire circumferential direction. The sipes 20C do not communicate with the outer circumferential groove 9B. The sipes 20C are divided into a plurality of portions by intersecting with the narrow grooves 34, and the divided portions are disposed on the same straight lines.

Figure 3A:
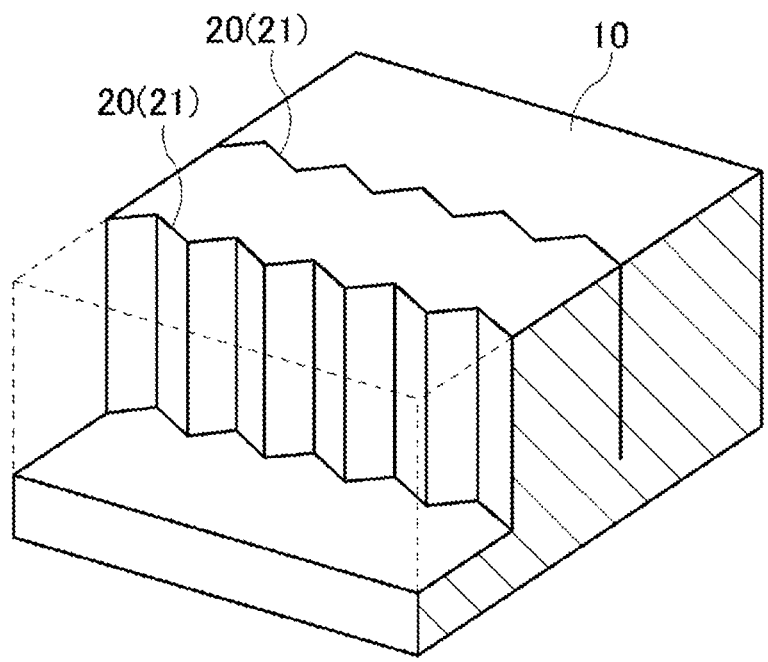
FIGS. 3A-3B are explanatory diagrams schematically illustrating a form of a sipe by cutting out a portion of a land portion including the sipe.
Figure 3B:
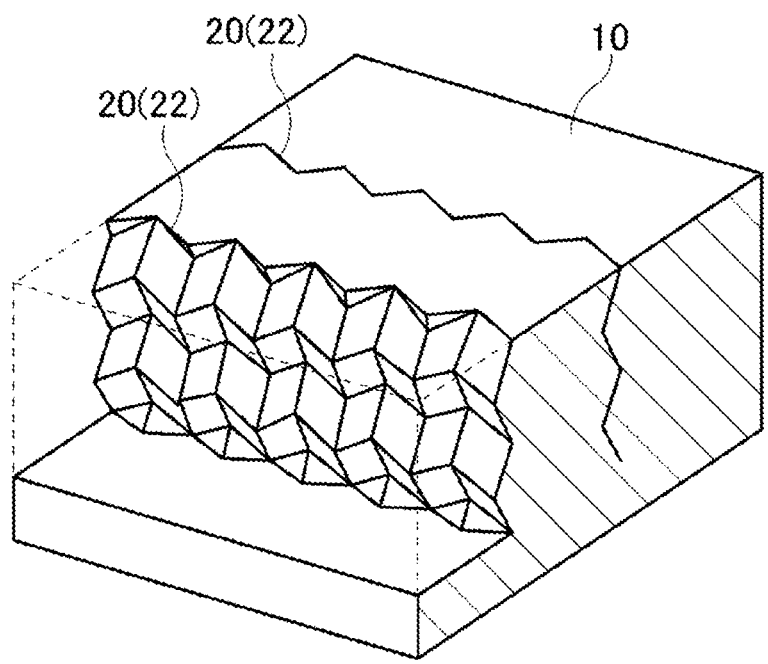

The sipes 20 (sipes 20A to 20C) described above include at least one two-dimensional sipe 21 and a plurality of three-dimensional sipes 22. In other words, all of the sipes 20 excluding the at least one two-dimensional sipe 21 are three-dimensional sipes 22. As illustrated in FIG. 3A, "two-dimensional sipe 21" is a sipe, the shape of which appearing on a tread surface (on a road contact surface of the tread portion 1) is constant along a sipe depth direction. For example, as in FIG. 3A, a zigzag shape on the tread surface indicates that the zigzag shape is maintained at any position in the sipe depth direction. Additionally, a linear shape on the tread surface indicates that the linear shape is maintained at any position in the sipe depth direction. Preferably, as illustrated, the two-dimensional sipe 21 has a linear shape that extends along the sipe depth direction in a cross-section (for example, a cross-section with hatched lines in the diagram) whose normal line direction is a sipe length direction. As illustrated in FIG. 3B, "three-dimensional sipe 22" is a sipe, the shape of which appearing on the tread surface changes along the sipe depth direction. For example, as in FIG. 3B, a zigzag shape on the tread surface indicates that the shape of the sipe changes into a linear shape or a different zigzag shape depending on the position in the sipe depth direction.

Additionally, a linear shape on the tread surface indicates that the shape of the sipe changes into a different shape from the linear shape such as a zigzag shape, depending on the position in the sipe depth direction. Preferably, as illustrated, the three-dimensional sipe 22 has a shape extending while bending along the sipe depth direction in a cross-section (for example, a cross-section with hatched lines in the diagram) whose normal line direction is the sipe length direction. The three-dimensional sipe 22, which includes, as illustrated, planes having complicated unevenness that mutually contact each other in accordance with a deformation of the land portion 10, yields more excellent wet performance and snow performance than the two-dimensional sipe 21.

When comparing the two-dimensional sipe 21 and the three-dimensional sipe 22, the two-dimensional sipe 21 with its structure described above is formed by a blade having less unevenness in the depth direction, and the blade tends to come out easily after vulcanization. Conversely, the three-dimensional sipe 22 with its structure described above is formed by a blade having more unevenness in the depth direction, and the blade tends to come out less easily after vulcanization. An embodiment of the present technology takes this difference into consideration such that a few of the three-dimensional sipes 22, from which the blades come out less easily, are disposed (disposing many of the two-dimensional sipes 21, from which the blades come out more easily) in the vicinity of the sector dividing position P (first boundary region S1) where the tread rubber tends to bond to the mold easily, thus preventing bonding between the tire mold and the tread rubber. Specifically, a ratio R1 of the number of the three-dimensional sipes 22 included in the first boundary region S1 with respect to the total number of the sipes 20 included in the first boundary region S1; and a ratio Rt of the number of the three-dimensional sipes 22 in all of the tread portion 1 with respect to the total number of the sipes 20 in all of the tread portion 1 satisfy the relationship R1<Rt.

Note that when counting the number of the sipes 20 (two-dimensional sipe 21 and three-dimensional sipe 22), the sipe 20 including at least a portion included in the first boundary region S1 is counted as the sipe 20 included in the first boundary region. Additionally, as in the intermediate land portion 10B and the shoulder land portion 10C in FIG. 2, when a pair of the sipes 20 are positioned on both sides of a groove and appear continuous, if the groove width of the groove positioned between the pair of sipes 20 is greater than the groove width of the sipe 20, they are counted as two divided separate sipes. Conversely, when the groove width of the groove positioned between the pair of sipes 20 is less than or equal to the groove width of the sipe 20, the pair of sipes 20 are counted as a single continuous sipe. In the illustrated example, the groove width of the lug groove 32 and that of the narrow groove 34 are larger than that of the sipe 20, and accordingly, the pair of sipes 20 positioned on both sides thereof are deemed as separate sipes.

By thus adopting the three-dimensional sipe 22 and the two-dimensional sipe 21 as the plurality of sipes 20, and configuring the ratio R1 of the number of the three-dimensional sipes 22 in the first boundary region S1 to be smaller than the ratio Rt of the number of the three-dimensional sipes 22 in all of the tread portion 1, bonding between the tire mold and the tread rubber can be prevented, and the occurrence of poor appearance can be suppressed.

Additionally, although the structure of the two-dimensional sipe 21 is simpler than that of the three-dimensional sipe 22 and running performance (wet performance and snow performance) based on the sipes 20 tends to be lower than that of the three-dimensional sipe 22, since a region having a lower ratio of the number of the three-dimensional sipes 22 is limited to the first boundary region S1 where contribution to bonding between the tire mold and the tread rubber is great, still a sufficient number of the three-dimensional sipes 22 are provided in the tire as a whole, and thus good running performance (wet performance and snow performance) based on the sipes 20 can be obtained. By using the two-dimensional sipe 21 or the three-dimensional sipe 22, that is, by using a difference in structure of the sipes 20 along the depth direction, rather than the shape of the sipe appearing on the tread surface, to adjust the easiness with which the blade comes out (the difficulty with which the rubber and the mold bond), this has no effect on the appearance of the tire (the sipe shape appearing on the tread surface).

When the size relationship between the ratio R1 and the ratio Rt is R1>Rt, a larger number of the three-dimensional sipes 22 are disposed in the first boundary region S1 where the tire mold and the tread rubber tend to bond easily, and bonding between the tire mold and the tread rubber cannot be prevented. When the ratio R1 and the ratio Rt are set to the size relationship described above, a ratio R1/Rt of the ratio R1 to the ratio Rt is preferably set to not greater than 0.80, and more preferably not less than 0.3 and not greater than 0.7. The ratio R1/Rt can thus be set to sufficiently reduce the ratio of the three-dimensional sipes 22 in the first boundary region S1, preventing bonding between the tire mold and the tread rubber, advantageously suppressing the occurrence of poor appearance. When the ratio R1/Rt exceeds 0.80, the difference between the ratio R1 and the ratio Rt decreases, and the ratio of the three-dimensional sipes 22 in the first boundary region S1 is not sufficiently reduced, and this causes a difficulty in sufficiently preventing bonding between the tire mold and tread rubber.

An embodiment of the present technology prevents bonding between the tire mold and the tread rubber by disposing the two-dimensional sipe 21 and the three-dimensional sipe 22, and the overall structure (tread pattern) of the tread portion 1 is not particularly limited. As in the illustrated example, however, when a plurality of rows of land portions 10 include three or more rows of land portions 10 including a pair of shoulder land portions 10C and when all of the land portions 10 include the plurality of sipes 20, particularly good effect can be obtained. When the ratio of the number of the three-dimensional sipes 22 included in the first boundary region S1 of each of the land portions 10 with respect to the total number of the sipes 20 included in the first boundary region S1 of each of the land portions 10 is R1', and the ratio of the number of the three-dimensional sipes 22 in an entire circumference of each of the land portions 10 with respect to the total number of the plurality of the sipes 20 included in the entire circumference of each of the land portions 10 is Rt', the relationship of a ratio R1'/Rt' between the land portions 10 can be adjusted to effectively prevent bonding between the tire mold and the tread rubber.

Specifically, the ratio R1'/Rt' in the shoulder land portion 10C is preferably smaller than the ratio R1'/Rt' in any other land portion. That is, due to the shape of the tire as a whole (toroidal shape), bonding between the tire mold and the tread rubber tends to occur relatively more easily in the shoulder land portion 10C than in any other land portion, and by minimizing the ratio R1'/Rt' in the shoulder land portion 10C (minimizing the ratio of the three-dimensional sipes 22 included in the first boundary region S1), bonding between the tire mold and the tread rubber can be effectively prevented, and the occurrence of poor appearance can be advantageously suppressed.

Alternatively, an inclination angle $\theta$, with respect to a tire width direction, of the sipes 20 provided in the first boundary region S1 of the land portion 10 having the smallest ratio R1'/Rt' is preferably smaller than an inclination angle $\theta$, with respect to the tire width direction, of the sipes 20 provided in the first boundary region S1 of any other land portion 10. Generally, the smaller the inclination angle $\theta$ of the sipe 20 is, the less easily a blade forming the sipe 20 comes out, and thus the inclination angle of the sipe 20 and the ratio R1'/Rt' can be associated to reduce the ratio of the three-dimensional sipes 22 included in the first boundary region S1, where the inclination angle $\theta$ of the sipe 20 is small and the blades do not easily come out, such that bonding between the tire mold and the tread rubber can be effectively prevented and the occurrence of poor appearance can be advantageously suppressed.

Note that the sector dividing position P basically divides sectors along the tire width direction, and the inclination angle $\theta$ of the sipe 20 with respect to the tire width direction is substantially synonymous with an inclination angle of the sipe 20 with respect to a sector dividing line (see FIG. 2). The inclination angle $\theta$ of the sipe 20 is an angle formed between: a straight line connecting the center positions of the groove width at both ends of the sipe 20 in a longitudinal direction; and the tire width direction (sector dividing line). Although the range of the inclination angle of the sipe 20 is not particularly limited, the inclination angle $\theta$, with respect to the tire width direction, of the sipe 20 provided in the first boundary region S1 of the land portion 10 having the smallest ratio R1'/Rt' can be set to, for example, from 0° to 10°, and the inclination angle $\theta$, with respect to the tire width direction, of the sipe 20 provided in the first boundary region S1 of any other land portion 10 can be set to, for example, from 15° to 40°.

The bonding between the tire mold and the tread rubber tends to occur more easily toward the sector dividing position P, and the ratio of the three-dimensional sipes 22 can be reduced toward the sector dividing position P to effectively prevent bonding between the tire mold and the tread rubber.

Accordingly, the ratio R1 of the number of the three-dimensional sipes 22 included in the first boundary region S1 with respect to the total number of the sipes 20 included in the first boundary region S1; and a ratio R2 of the number of the three-dimensional sipes 22 included in the second boundary region S2 with respect to the total number of the sipes 20 included in the second boundary region S2 preferably satisfy the relationship R1>R2. Thus setting a relationship between the ratios R1, R2 reduces the ratio of the three-dimensional sipes toward the sector dividing position, effectively preventing bonding between the tire mold and the tread rubber and advantageously suppressing the occurrence of poor appearance. Note that the number of the sipes 20 included in the second boundary region S2 is counted the same way as that included in the first boundary region S1. When the sipe 20 includes at least a portion included in the secondary boundary region S2, the sipe 20 is counted as a sipe included in the second boundary region S2.

As described above, an embodiment of the present technology prevents bonding of the tire mold and the tread rubber by disposing the two-dimensional sipe 21 and the three-dimensional sipe 22; still generally, the shallower the sipe 20 is, the more easily a blade forming the sipe 20 comes out. Thus, not only a difference in structures of the two-dimensional sipe 21 and the three-dimensional sipe 22, but also sipe depths can be considered to adjust the easiness with which the blade comes out. Specifically, an average D1 of the maximum depths of the sipes 20 included in the first boundary region S1 and an average Dt of the maximum depths of the sipes 20 in all of the tread portion 1 preferably satisfy the relationship D1<Dt. As described above, the smaller the maximum depth of the sipe 20 is, the more easily a blade forming the sipe 20 comes out, and thus by reducing the maximum depths of the sipes 20 in the vicinity of the sector dividing position P (first boundary region S1) where the tread rubber tends to bond to the mold easily, bonding between the tire mold and the tread rubber can be effectively prevented, and the occurrence of poor appearance can be advantageously suppressed. When the relationship between the sipe depths is thus set, a ratio D1/Dt is preferably set to, for example, within a range of from 0.30 to 0.80. Note that "average of the maximum depths of the sipes 20" refers to averaging the maximum depth of each of the sipes 20 included in the region of interest (depths from the road contact surface of the tread portion 1 to the maximum depth portions of the sipes 20).

A type of tire to which a sipe structure according to an embodiment of the present technology is applied is not particularly limited, but preferably, such a sipe structure is applied to a winter tire including a plurality of sipes. In the winter tire to which an embodiment of the present technology is applied, wet performance and snow performance can be enhanced, bonding of a tire mold and tread rubber can be prevented, and the occurrence of poor appearance during vulcanization molding can be suppressed, without changing the appearance of the tire.

EXAMPLES

Tires of Conventional Example 1, Comparative Examples 1 and 2, and Examples 1 to 13 are manufactured. The tires have: a tire size of 205/55R16, a basic structure illustrated in FIG. 1, and a basic tread pattern of FIG. 2. The tires are set for: presence of sipes in a boundary region, a size relationship of the ratios R1, Rt, the ratio R1/Rt, a land portion having the smallest ratio R1'/Rt', a land portion having the smallest inclination angle θ, a size relationship of the ratios R1, R2, and a size relationship of the depths D1 and Dt as indicated in Table 1.

Note that a tire of Conventional Example 1 has a structure in which the number of sipes in the first boundary region (second boundary region) is so reduced that no sipes are disposed in the first boundary region (second boundary region).

In each of the columns of "Land portion having smallest ratio R1'/Rt'" and "land portion having smallest inclination angle θ", a type of land portion (Center, Intermediate, or Shoulder) is indicated. The ratio R1'/Rt' or the inclination angle θ that is common in all of the land portions is indicated as "Uniform".

The test tires are evaluated, according to the following test methods, for braking performance on wet road surfaces (wet performance), braking performance on icy and snowy road surfaces (snow performance), and a poor appearance occurrence rate. Table 1 shows the results.

Wet Performance

Each of the test tires is assembled on a wheel having a rim size of 16×7J, inflated to an air pressure of 230 kPa, and mounted on a test vehicle (passenger vehicle) having an engine displacement of 2000 cc. Braking is performed from a traveling condition at a speed of 40 km/h on a wet road surface, and a braking distance until the test vehicle comes to a complete stop is measured. The evaluation results are expressed as index values using reciprocals of measurement values, with Conventional Example 1 being assigned an index value of 100. Larger index values indicate excellent braking performance on wet road surfaces (wet performance).

Snow Performance

Each of the test tires is assembled on a wheel having a rim size of 16×7J, inflated to an air pressure of 230 kPa, and mounted on a test vehicle having an engine displacement of 2000 cc. Braking is performed from a traveling condition at a speed of 40 km/h on an icy and snowy road surface, and a braking distance until the test vehicle comes to a complete stop is measured. The evaluation results are expressed as index values using reciprocals of measurement values, with Conventional Example 1 being assigned an index value of 100. Larger index values indicate excellent braking performance on icy and snowy road surfaces (snow performance).

Poor Appearance Occurrence Rate 1000 of each of the test tires are manufactured, chips and cracks of a land portion in each boundary region (first boundary region) in a tire circumferential direction are visually confirmed, and the number of the boundary regions with the occurrence of the chips and the cracks is counted. The evaluation results show the ratio of the number of boundary regions with the occurrence of chips and cracks in each of the test tires. Smaller ratios indicate a superior suppressing effect on the occurrence of poor appearance.

TABLE 1-1

|  | | Conventional Example 1 | Comparative Example 1 | Comparative Example 2 |
|---|---|---|---|---|
| Presence of sipe in boundary region | | No | Yes | Yes |
| Size relationship of ratios R1, Rt | | — | R1 > Rt | R1 = Rt |
| Ratio R1/Rt | | — | 1.2 | 1.0 |
| Land portion having smallest ratio R1'/Rt' | | — | Uniform | Uniform |
| Land portion having smallest inclination angle θ | | — | Uniform | Uniform |
| Size relationship of ratios R1, R2 | | — | R1 = R2 | R1 = R2 |
| Size relationship of depths D1, Dt | | — | D1 = Dt | D1 = Dt |
| Snow performance | Index value | 100 | 95 | 105 |
| Wet performance | Index value | 100 | 95 | 105 |
| Appearance failure rate | % | 0.5 | 0.5 | 0.5 |

TABLE 1-2

|  | | Example 1 | Example 2 | Example 3 | Example 4 | Example 5 |
|---|---|---|---|---|---|---|
| Presence of sipe in boundary region | | Yes | Yes | Yes | Yes | Yes |
| Size relationship of ratios R1, Rt | | R1 < Rt | R1 < Rt | R1 < Rt | R1 < Rt | R1 < Rt |
| Ratio R1/Rt | | 0.9 | 0.8 | 0.3 | 0.8 | 0.8 |
| Land portion having smallest ratio R1'/Rt' | | Uniform | Uniform | Uniform | Center | Intermediate |
| Land portion having smallest inclination angle θ | | Uniform | Uniform | Uniform | Uniform | Uniform |
| Size relationship of ratios R1, R2 | | R1 = R2 | R1 = R2 | R1 = R2 | R1 = R2 | R1 = R2 |
| Size relationship of depths D1, Dt | | D1 = Dt | D1 = Dt | D1 = Dt | D1 = Dt | D1 = Dt |
| Snow performance | Index value | 105 | 105 | 101 | 105 | 105 |
| Wet performance | Index value | 105 | 105 | 101 | 105 | 105 |
| Appearance failure rate | % | 0.1 | 0.05 | 0.05 | 0.05 | 0.05 |

TABLE 2-1

|  | | Example 6 | Example 7 | Example 8 | Example 9 |
|---|---|---|---|---|---|
| Presence of sipe in boundary region | | Yes | Yes | Yes | Yes |
| Size relationship of ratios R1, Rt | | R1 < Rt | R1 < Rt | R1 < Rt | R1 < Rt |
| Ratio R1/Rt | | 0.8 | 0.8 | 0.8 | 0.8 |
| Land portion having smallest ratio R1'/Rt' | | Shoulder | Shoulder | Shoulder | Shoulder |
| Land portion having smallest inclination angle θ | | Uniform | Center | Intermediate | Shoulder |
| Size relationship of ratios R1, R2 | | R1 = R2 | R1 = R2 | R1 = R2 | R1 = R2 |
| Size relationship of depths D1, Dt | | D1 = Dt | D1 = Dt | D1 = Dt | D1 = Dt |
| Snow performance | Index value | 108 | 108 | 108 | 108 |
| Wet performance | Index value | 108 | 108 | 108 | 108 |
| Appearance failure rate | % | 0.03 | 0.03 | 0.03 | 0.01 |

TABLE 2-2

|  |  | Example 10 | Example 11 | Example 12 | Example 13 |
|---|---|---|---|---|---|
| Presence of sipe in boundary region | | Yes | Yes | Yes | Yes |
| Size relationship of ratios R1, Rt | | R1 < Rt | R1 < Rt | R1 < Rt | R1 < Rt |
| Ratio R1/Rt | | 0.8 | 0.8 | 0.8 | 0.8 |
| Land portion having smallest ratio R1'/Rt' | | Uniform | Uniform | Uniform | Uniform |
| Land portion having smallest inclination angle θ | | Uniform | Uniform | Uniform | Uniform |
| Size relationship of ratios R1, R2 | | R1 < R2 | R1 > R2 | R1 = R2 | R1 = R2 |
| Size relationship of depths D1, Dt | | D1 = Dt | D1 = Dt | D1 > Dt | D1 < Dt |
| Snow performance | Index value | 104 | 110 | 104 | 110 |
| Wet performance | Index value | 104 | 110 | 104 | 110 |
| Appearance failure rate | % | 0.15 | 0.02 | 0.15 | 0.01 |

As can be seen from Tables 1 to 2, each of Examples 1 to 10 provides, in a well-balanced manner, better wet performance and snow performance as well as a lower poor appearance occurrence rate than Conventional Example 1. On the other hand, in Comparative Example 1, the ratio R1 is greater than the ratio Rt, the ratio of the three-dimensional sipes included in the first boundary region is greater, and thus the appearance failure rate is worsened. In Comparative Example 2, the ratio R1 and the ratio Rt are equal, there is no difference in the ratios of the three-dimensional sipes between the entire tire and the first boundary region, and thus the appearance failure rate cannot be lowered.

The invention claimed is:

1. A pneumatic tire, comprising:
in a tread portion, a plurality of circumferential grooves extending in a tire circumferential direction;
a plurality of rows of land portions defined by the plurality of circumferential grooves;
in at least one of the plurality of rows of land portions, a plurality of sipes extending in a tire width direction; and
the tread portion being formed by a plurality of sectors divided in the tire circumferential direction,
each one of the rows of land portions having a different configuration of the sipes than an adjacent one of the rows of land portions,
the plurality of sipes comprising a three-dimensional sipe, whose shape appearing on a tread surface changes along a sipe depth direction, and a two-dimensional sipe, whose shape appearing on the tread surface is constant along the sipe depth direction,
a range within 15 mm on each side of a sector dividing position in the tire circumferential direction and extending across an entirety of the tread portion being a first boundary region, and
a ratio R1 of a number of a plurality of the three-dimensional sipes disposed in the first boundary region with respect to a total number of the plurality of sipes disposed in the first boundary region and a ratio Rt of a number of the plurality of three-dimensional sipes in all of the tread portion with respect to a total number of the plurality of sipes in all of the tread portion satisfying a relationship R1<Rt,
a ratio R1/Rt of the ratio R1 and the ratio Rt being 0.80 or less,
the plurality of rows of land portions comprising three or more rows of land portions comprising a pair of shoulder land portions,
all of the plurality of rows of land portions comprising the plurality of sipes,
a ratio of a number of the plurality of three-dimensional sipes disposed in the first boundary region of each of the plurality of rows of land portions with respect to a total number of the plurality of sipes disposed in the first boundary region of each of the plurality of rows of land portions being R1',
a ratio of a number of the plurality of three-dimensional sipes in an entire circumference of each of the plurality of rows of land portions with respect to a total number of the plurality of sipes in the entire circumference of each of the plurality of rows of land portions being Rt', and
a ratio R1'/Rt' in each of the pair of shoulder land portions being smaller than a ratio R1'/Rt' in any other of the plurality of rows of land portions.

2. The pneumatic tire according to claim 1, wherein an inclination angle, with respect to the tire width direction, of the plurality of sipes provided in a land portion having a smallest ratio R1'/Rt' is smaller than an inclination angle, with respect to the tire width direction, of the plurality of sipes provided in any other of the plurality of rows of land portions.

3. The pneumatic tire according to claim 2, wherein
a range within 5 mm on each side of the sector dividing position in the tire circumferential direction is a second boundary region, and
the ratio R1 of the number of the plurality of three-dimensional sipes disposed in the first boundary region with respect to the total number of the plurality of sipes disposed in the first boundary region and a ratio R2 of a number of the plurality of three-dimensional sipes disposed in the second boundary region with respect to a total number of the plurality of sipes disposed in the second boundary region satisfy the relationship R1>R2.

4. The pneumatic tire according to claim 3, wherein an average D1 of maximum depths of the plurality of sipes disposed in the first boundary region and an average Dt of maximum depths of the plurality of sipes in all of the tread portion satisfy the relationship D1<Dt.

5. The pneumatic tire according to claim 1, wherein a range within 5 mm on each side of the sector dividing position in the tire circumferential direction is a second boundary region, and
the ratio R1 of the number of the plurality of three-dimensional sipes disposed in the first boundary region with respect to the total number of the plurality of sipes disposed in the first boundary region and a ratio R2 of a number of the plurality of three-dimensional sipes disposed in the second boundary region with respect to a total number of the plurality of sipes disposed in the second boundary region satisfy the relationship R1>R2.

6. The pneumatic tire according to claim 1, wherein an average D1 of maximum depths of the plurality of sipes disposed in the first boundary region and an average Dt of maximum depths of the plurality of sipes in all of the tread portion satisfy the relationship D1<Dt.

* * * * *